UNITED STATES PATENT OFFICE 2,319,304

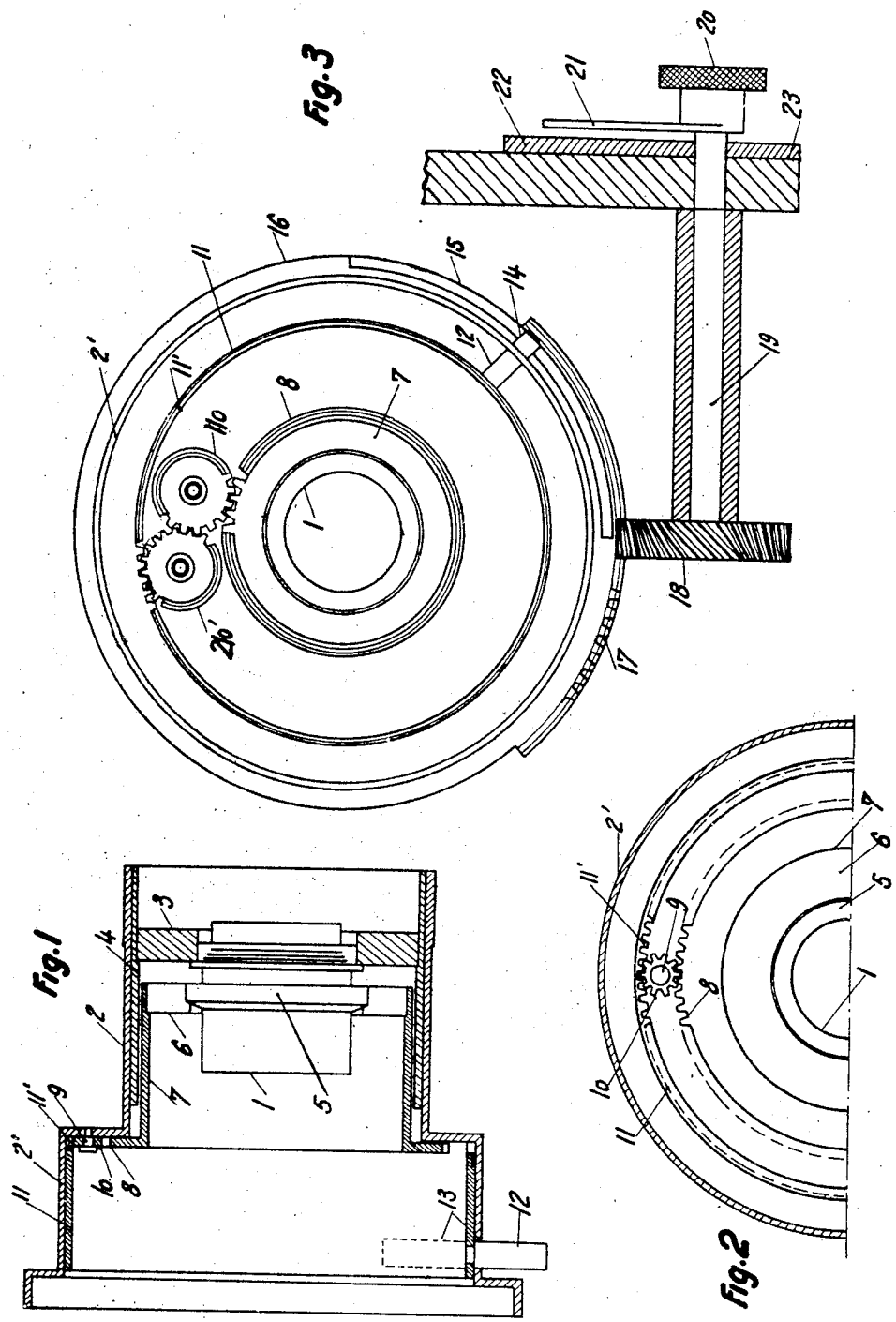

DIAPHRAGM CONTROL DEVICE FOR MOTION AND STILL PICTURE CAMERAS

Maurice Albert Dalotel, Deuil, France; vested in the Alien Property Custodian

Application December 22, 1939, Serial No. 310,626
In France December 22, 1938

2 Claims. (Cl. 95—64)

The present invention relates to motion or still picture cameras which are adapted to receive successively and in the same housing a plurality of objectives of different focal lengths. It concerns a diaphragm control device and its particular object is to provide such a device which is so arranged that whatever one of the objectives is mounted on the camera, the same scale indicates the real stop of its diaphragm. It is known that the opening of an objective is adjusted by means of a diaphragm, generally of the iris type, which is manually operated by a ring which is outside the objective and which carries a graduation which is adapted to move in front of a fixed mark. The diameter and the graduation of the ring that controls the iris are different according to the focal length, the maximum opening or the make of the lens and, furthermore, the same angular movement of said ring corresponds, for the various objectives, to different variations of the opening. Sometimes, the iris ring has to be rotated in opposite directions in two different objectives in order to produce a variation of the opening in the same direction. This state of things is a serious drawback for modern motion picture cameras in which it is often essential to be able to control the stop of the diaphragm by means of a control member arranged outside the camera, at the rear or at the side, instead of directly actuating the diaphragm ring itself. But, for the reasons set forth above, in order to obtain this control, it is necessary for there to be, either as many interchangeable dials, graduated in stops, as there are different objectives, or a dial with multiple graduations, which is a complication.

The present invention is intended to overcome the above drawback and, in its preferred embodiment, it is characterized by the fact that the ring of the diaphragm is secured to a ring gear which is adapted to engage, either directly or through one or more intermediate pinions, with a control member mounted on the camera, the diameters of the ring gear secured to the ring of the diaphragm and of the intermediate pinion or pinions being so calculated for each objective that a given position of the control member corresponds to the same stop of the diaphragm, whatever lens is mounted in the camera, thereby enabling a single graduated dial to be used for the stops.

By way of example, one embodiment of the device which is the object of the present invention has been described hereinafter and illustrated in the accompanying drawing in which:

Fig. 1 shows an axial sectional elevation of said device.

Fig. 2 is a partial transverse section thereof.

Fig. 3 shows a transverse sectional view of a modification of the device with its control members.

As shown in Figs. 1 and 2, the objective or lens 1 is held in a mount 2, formed by a bush provided at the front with a widened portion 2' forming a cup, by means of a threaded ring 3 and of a bush 4 locked in the mount 2, the mounts 2, 2' being the same for all the lenses, so that they can be introduced into the housing of the camera. On the diaphragm 5 is fixed a ring 6 secured to a bush 7 provided at the front with a toothed collar 8 meshing with a pinion 10 mounted on a spindle 9 journalled in the bottom of the cup 2' of the mount 2. An actuating ring 11, rotatably mounted in the cup 2', is provided near its inner edge with internal teeth 11' meshing with the intermediate pinion 10, so that the rotation of the ring 11 causes the control ring 6 of the diaphragm 5 to rotate. According to the preferred embodiment of the invention, the diameters of the toothed collar 8 and of the intermediate pinion 10 are so chosen for each lens that, whatever lens is used, the same angular position of the actuating ring 11 always corresponds to the same value of the stop, thereby enabling a single graduation in stops to be used on a single dial.

In the case of lenses whereof the diaphragm requires to be rotated in the opposite direction to that of the actuating ring 11 in order to correspond to the direction of the single graduation, there are provided on the bottom of the cup 2', as shown in Fig. 3, two intermediate pinions 110, 210, one of which meshes with the toothed collar 8 secured to the ring 6 of the diaphragm and the other meshes with the ring gear 11' of the actuating ring 11. It would however be possible, in this case, in order to avoid this use of two pinions, to provide on the dial two graduations corresponding to the two directions of rotation of the diaphragms.

The actuating ring 11 carries a projection 12 passing through the cup 2' in a circular groove 13 provided in said cup. In the case in which the control member of the diaphragm has to be located on the side of the camera, this control may be obtained as shown in Fig. 3; when the amount is placed in position, the projection 12 of the ring 11 engages in an open slot 14 of a solid quadrant 15 secured to a rotatable ring 16 concentric with the cup 2'. Said ring 16 carries a quadrant 17 with external helical teeth meshing with a perpendicular pinion 18, the shaft 19 of which is actuated by means of a knob 20 provided with an index 21 which moves opposite a dial 22 which is graduated in stops and is fixed on the side wall 23 of the camera.

I claim:

1. In a diaphragm control device for motion or still picture camera provided with a universal socket for selectively receiving any one of a series of exchangeable objectives, having all an identical external mount adapted to fit said socket and a diaphragm provided with a control ring, the combination comprising a diaphragm controlling member arranged on one side of the camera, a single scale of diaphragm stops associated with the said member, a transmission in each objective mount consisting of a rotatable tube integral with the diaphragm control ring and provided at one end with a toothed collar, a second rotatable tube arranged within the mount and also having at one end a toothed collar, means for coupling said second tube with the diaphragm controlling member, and at least one intermediate pinion having an axis journalled on the mount and which engages both toothed collars, the ratio of the said transmission being adapted to the characteristics of each objective respectively so as the same diaphragm opening corresponds to a given position of the controlling member with respect to the single scale, whatever the objective used.

2. A diaphragm control device according to claim 1 wherein the means for coupling the second rotatable tube with the controlling member comprise a ring concentric with the external mount and rotatably arranged thereon, means for rotating said ring by the controlling member, a quadrant secured on said ring and provided with an open longitudinal slot, a circular groove provided in the external mount, a pin secured to the rotatable tube to be driven which projects through said groove and engages the slot of the quadrant secured to the rotatable ring.

MAURICE ALBERT DALOTEL.